J. M. CHMELAR.
WIRE GATE HOLDING DEVICE.
APPLICATION FILED SEPT. 27, 1916.
1,212,905.
Patented Jan. 16, 1917.
2 SHEETS—SHEET 1.
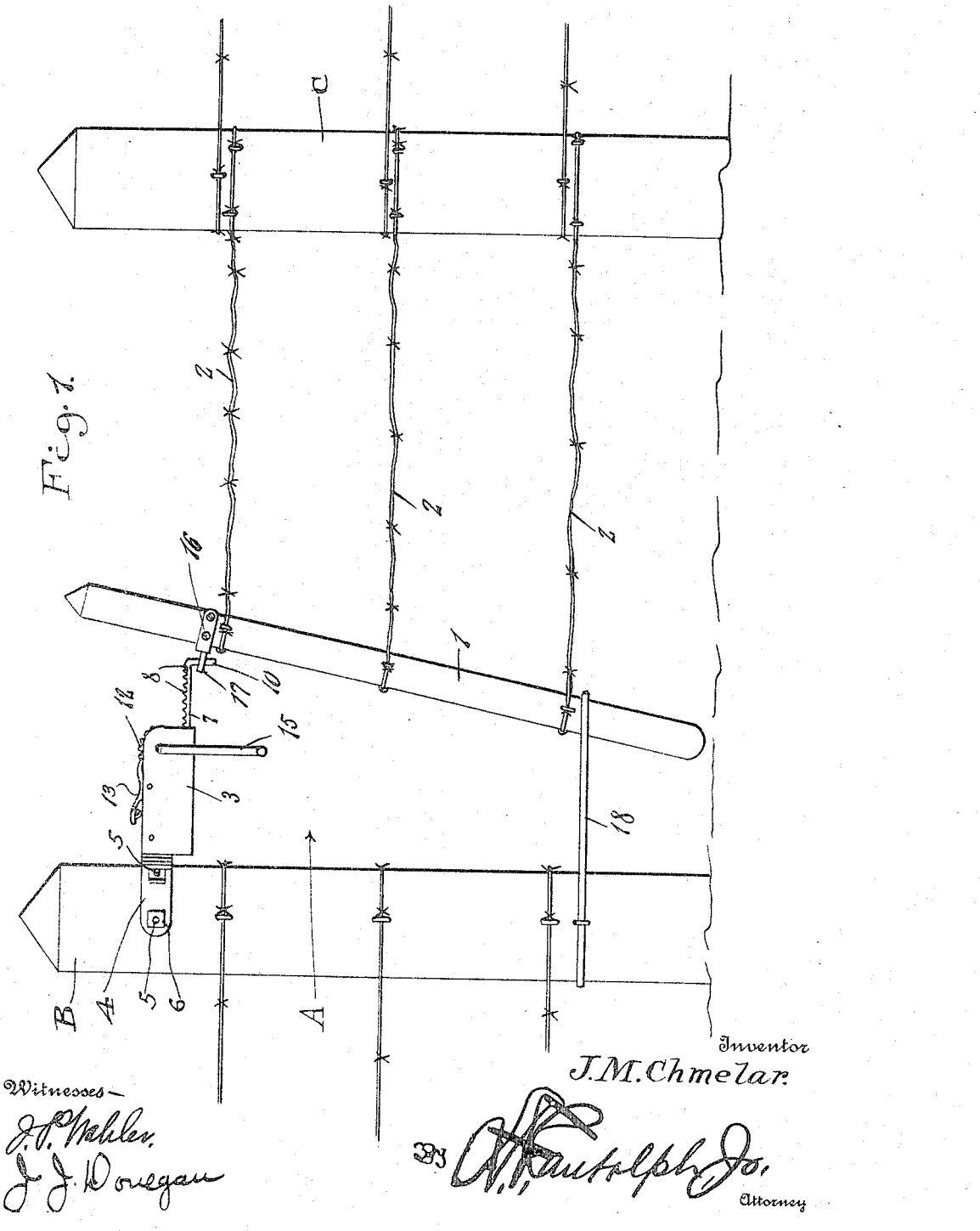
Witnesses
J. P. Whiler
J. J. Donegan
Inventor
J. M. Chmelar.
By
Attorney

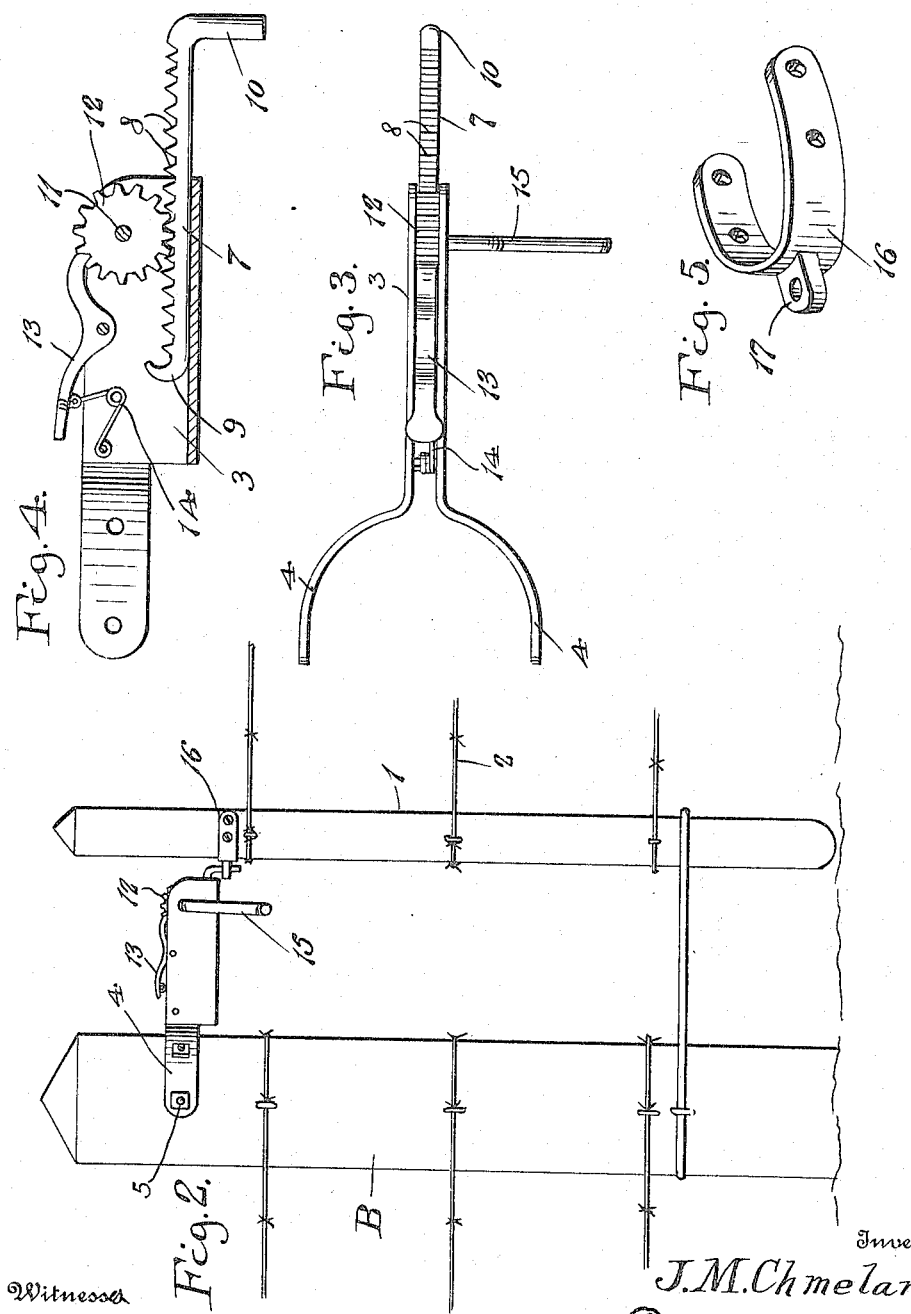

UNITED STATES PATENT OFFICE.

JOSEPH M. CHMELAR, OF ROY, MONTANA.

WIRE-GATE-HOLDING DEVICE.

1,212,905.  Specification of Letters Patent.  Patented Jan. 16, 1917.

Application filed September 27, 1916. Serial No. 122,429.

*To all whom it may concern:*

Be it known that I, JOSEPH M. CHMELAR, a citizen of the United States, residing at Roy, in the county of Fergus and State of Montana, have invented certain new and useful Improvements in Wire-Gate-Holding Devices; and I do hereby declare the following to be a full, clear, and exact description of the invention, such as will enable others skilled in the art to which it appertains to make and use the same.

The object of this invention is the provision of novel means designed to be associated with a wire gate and the adjacent fence post, and effectively hold the gate against being opened by animals when the gate is in closed position.

Another object of the invention is the provision of simple, durable and efficient holding means for carrying out the above object, and which can be easily mounted in operative-position and will admit of a person conveniently releasing the gate when it is desired to open the same.

Other objects will appear and be better understood from that embodiment of my invention of which the following is a specification, reference being had to the accompanying drawings forming a part thereof, in which:

Figure 1 is a side view of the gate, showing the same in partially closed position, Fig. 2 is a detail view of the forward or free end of the gate, showing the gate in closed position, Fig. 3 is a top plan view of the gate holding mechanism, Fig. 4 is a longitudinal sectional view, taken through Fig. 3, Fig. 5 is a perspective view of a bracket designed to be associated with the gate and to be operatively engaged by the gate holding mechanism.

Referring to the drawings in detail, and particularly to Fig. 1, a wire fence is shown having a gate opening A therein, and located at the opposite sides of the opening is a pair of gate posts, designated, respectively, B and C. The gate for closing the opening A is shown as consisting of a vertical upright 1 and a plurality of parallel wires 2, arranged one above the other and each having one end connected to a panel 1 and its opposite end connected to the gate post C. The wire strands 2 are of such length that when the panel 1 is in the position shown in Fig. 2 the strands will approximately span the opening A.

The gate holding mechanism consists of a U-shaped housing or casing 3, formed of metal, and its rear end provided with a pair of opposed semicircular flanges 4, which are adapted to receive therebetween the upper end of a gate post B and to be secured thereto by means of fastening bolts 5 and nuts 6. When the housing 3 is in operative position, as shown in Figs. 1 and 2, the same projects slightly beyond the post B. Slidably mounted within the housing 3 is a bar 7, which has its upper face provided with a plurality of teeth 8, and the inner end of the bar 7 is curved upwardly, as shown at 9, and the outer end is bent downwardly to provide a finger 10. A shaft 11 is journaled within the sides of the housing or casing 3, and carries a gear wheel 12, the teeth of which mesh with the teeth 8 on the bar or rod 7. When the shaft 11 is rotated in one direction the bar or rod 7 will be moved outwardly and on retrograde rotation of the shaft 11 the rod 7 will be moved inwardly. A pawl 13 is pivoted within the housing 3 and has one end engaging the teeth of the gear 12 and serves to prevent accidental retrograde rotation of the shaft and gear 11 and 12. A V-shaped spring 14 is located at the inner end of the housing or casing 3 and engages the rear end of the pawl 13 and is adapted to normally force the pawl into engagement with the teeth of the gear 12. One end of the shaft 11 is extended beyond the adjacent side of the U-shaped casing 3 and is formed to provide a crank 15, which will admit of the convenient rotation of the shaft 11. A U-shaped bracket 16 embraces the panel 1 of the gate and has its forward side or bight portion provided with an apertured lug 17 for receiving the finger 10 on the rod 7, when the gate is in closed position.

A wire hoop 18 encircles the lower end of the post B and is secured thereto, and the said hook has a portion thereof projecting beyond the inner side of the post B, and is adapted to receive the lower end of the panel 1, when the gate is in closed position. In closing the gate, the panel 1 is tilted, as shown in Fig. 1, and the lower end inserted within the hoop 18. The shaft 11 is then rotated in the direction to project the outer end of the rod 7 out of the casing 3, and the finger 10 is then inserted into the apertured lug 17. The shaft 11 is then rotated in the opposite direction so as to cause inward movement of the rod 7 and effect raising of the panel 1 to the vertical, and also moving the same toward the post, as shown in Fig. 1, whereby to cause the wire strands 2 to extend across the opening A and obstruct passage through the gate opening.

It is evident that various changes might be resorted to in the construction, form and arrangement of the several parts without departing from the spirit and scope of the invention; hence I do not wish to limit myself strictly to the structure herein described and claimed.

Having thus described my invention what I claim as new, is:

A combined gate closing and holding device consisting of a U-shaped casing adapted to be mounted on a gate post, a gate engaging rod slidably mounted within the casing and provided with teeth, a wheel mounted within the casing and having teeth thereon for engaging the teeth on the rod so as to effect movement of the rod when the wheel is rotated, a manipulating element for the wheel, and a pawl located within the casing and engaging the teeth on the wheel.

In testimony whereof I affix my signature in presence of two witnesses.

JOSEPH M. CHMELAR.

Witnesses:
B. F. WHITMORE,
JOHN URBAN.

Copies of this patent may be obtained for five cents each, by addressing the "Commissioner of Patents, Washington, D. C."